Feb. 18, 1958  J. V. COFFMAN  2,823,825
SWING GATE FOR PROCESSING VESSELS
Filed May 6, 1954

INVENTOR.
JAMES V. COFFMAN
BY
Pennie, Edmonds, Morton, Barrows & Taylor
ATTORNEYS

United States Patent Office 2,823,825
Patented Feb. 18, 1958

2,823,825

SWING GATE FOR PROCESSING VESSELS

James V. Coffman, East Liverpool, Ohio, assignor to The Patterson Foundry and Machine Company, a corporation of Ohio Application May 6, 1954, Serial No. 428,098

1 Claim. (Cl. 220—57)

This invention relates to closures for enclosed vessels of the type used in processing materials under varying pressures and temperatures. More particularly the invention provides a gate closure for facilitating the charging and discharging of materials in enclosed vessels, such as stationary or rotary vacuum dryers or impregnators, as well as vacuum crystallizers and other types of processing equipment operating under vacuum or pressure, wherein efficiency of operation is enhanced by high sealing integrity, unrestricted opening during charging and discharging, and a contour within the enclosed vessel which prevents the trapping and holding of the material during processing.

In the processing industry, operations frequently require closely controlled pressures and temperatures in enclosed vessels. Control of conditions specified for a particular process is likely to be impaired by poor sealing of the enclosed vessel. This is especially significant in the case of rotary vessels having one or more bearing glands for entry of pipes and shafts therein. Since losses attributable to leakage through such bearing glands are usually unavoidable, it is essential that the material charging and discharging parts of the vessel are adequately sealed.

In processing solid materials in a dry or damp condition, or suspensions of solids, it is necessary to provide a closure with a minimum of grooves, angles, and corners in the sealing surfaces which are difficult to clean or apt to trap and retain solid material which will prevent high sealing integrity.

Furthermore, in some rotating vessels, particularly those used for processing materials of high viscosity or consistency, or solids having adhering or bridging tendencies, it is important that the closure shall provide a contour within the vessel which minimizes the entrainment of material and formation of stagnant zones.

Valve closures of the swing gate type which provide an unobstructed opening, are particularly suited for charging and discharging such materials and closing such vessels during treatment, and when constructed according to my invention provide smooth sealing-contact surfaces which are readily accessible for cleaning and also a contour within the sealed vessel which is least likely to retain a stagnant zone of material.

The swing gate of my invention includes clamping means which applies pressure centrally of the gate so as to distribute the sealing pressure uniformly over a sealing gasket and is in a plane perpendicular to the axis of the opening for the vessel, and a flexible connection of the gate to its clamping means to permit the gate to center itself in place on the vessel opening. Means are also included which are especially advantageous when the swing gate is used on rotary vessels which maintains the gate in proper co-operable relation with its clamping means so that it will not shift out of the desired registrable position with the vessel opening as the vessel is rotated.

My invention provides a swing gate closure of high sealing integrity, for use in charging and discharging materials, and which is advantageously useful in vessels for carrying out processes wherein the materials are heated or cooled in the vessel and are subjected to vacuum or pressure conditions. The closure comprises a housing suitably attached to the vessel or constructed integrally therewith and having an opening therein for access to the vessel. The housing preferably surrounds the entire opening to guide material fed to and from the vessel. A shaft is rotatably mounted on the housing lateral to a side of the closure opening, and a lever arm is secured on the shaft and extends normal thereto. The gate is flexibly connected at its center to the lever arm so as to swing in an arc about an axis parallel to the axis of the shaft and thereby center itself in place on the closure opening. The gate closes over a gasket, preferably secured in a plate surrounding the opening. Spring means operable on the gate stabilize the gate and maintain it at all times between the lever arm and the opening in the housing so that the gate will not swing out of registrable position as the lever is swung and the vessel is rotated. Suitable drive means are provided for rotating the shaft to swing the gate into sealing relation with the gasket around the closure opening through co-action and control of the lever arm and said spring means.

Figure 1:
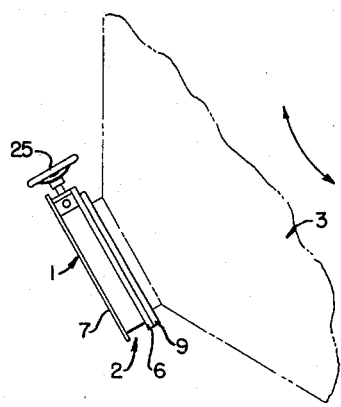
Fig. 1 is a side elevation of a preferred embodiment of the swing gate incorporated on a rotary mixing vessel.
Figure 2:
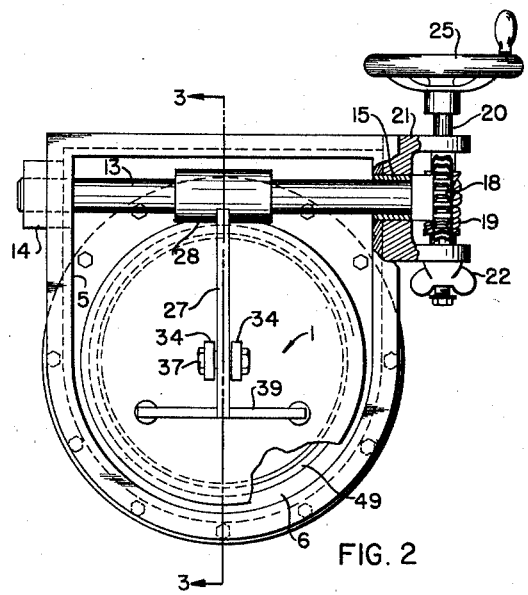
Fig. 2 is an enlarged front view of the swing gate shown in Fig. 1.
Figure 3:
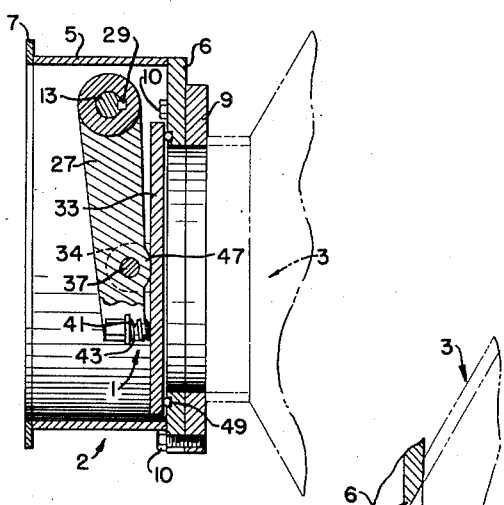
Figs. 3 and 4 are sectional views taken along line 3—3 in Fig. 2, showing the swing gate in closed and open positions.
Figure 4:
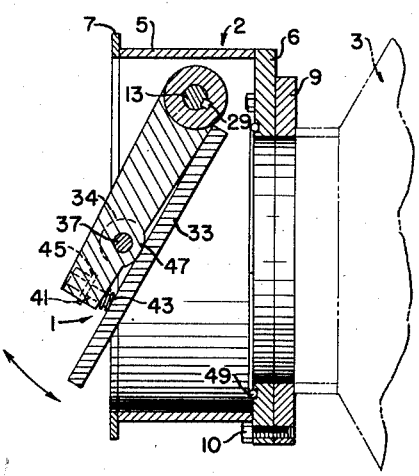

The swing gate 1 of my invention is rotatably mounted in a housing 2 attached to an opening in an enclosed processing vessel 3. The vessel may be of the rotary variety having frusto-conical walls and being rotatable about an axis transverse to the axis of these walls.

The housing 2 includes a U-shaped enclosed wall 5 suitably attached at an inner extremity to a flat open plate 6 and having a lateral flange 7 at its outer extremity. Plate 6 is secured to a flat ring 9 by a plurality of circumferentially arranged bolts 10 passing through the plate, and ring 9, in turn, is secured in any suitable manner, as by a welded or bolted connection, to an opening in the wall of vessel 3.

Figure 5:
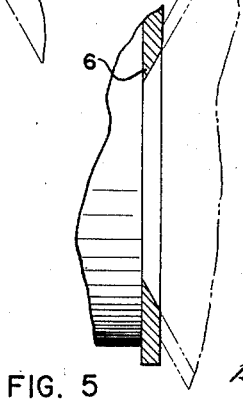
Fig. 5 illustrates a modification of swing gate attachment to a processing vessel.

In the modification shown in Fig. 5, the plate 6 is integral with vessel 3 and is connected as by welding directly to the sloping sides of the processing vessel 3, thus eliminating the cylindrical neck and plate 9 of Figs. 1 to 4. This provides a contour line within the vessel which is least likely to retain stagnant material.

Passing through the upper extremity of the enclosed U-shaped wall 5 is a shaft 13 suitably journaled in bearings 14 and 15 for rotatably mounting the shaft 13 in the wall 5. One end of shaft 13 has a worm gear 18 clearing housing 2 and engaging a worm 19, the worm being mounted on a short shaft 20 passing through a bracket 21 secured to the outer face of wall 5. The shaft 20 is retained in bracket 21 in any conventional manner or the worm may have sufficient length to prevent movement in any axial direction. The wing nut 22 serves to lock shaft 20 and worm 19 against accidental rotation.

The other end of the shaft 20 has a hand wheel 25 for driving the shaft through intermediation of worm 19 and worm gear 18. A lever arm 27, having a bushing 28 surrounding the shaft 13 and keyed to shaft 13 at 29 for rotation therewith, flexibly supports the swing gate 1.

The swing gate comprises a flat circular disc 33 having a pair of centrally located brackets 34 and a pin 37 which passes through the brackets 34 and lever arm 27, so as to render the swing gate pivotable about an axis parallel to the axis of shaft 13; a pair of lateral extensions 39 are provided at the lower end of lever 27. Each of these extensions extend in opposite directions from the lower end of lever 27 and overlie the swing gate 33. A pin 41 integral with each extension 39 is surrounded by a compression spring 43, the spring being retained between the outer face of swing gate 33 and a washer 45 provided about each pin 41.

The lever 27 has a rounded boss 47 which evenly engages the outer face of the swing gate 33, the pin being preferably mounted in the lever eccentric to the axis of shaft 13 in order to render swing gate 33 substantially offset from the lever. The springs 43 for each of the pins 41 urge the lower extremity of the swing gate 33 inwardly about the pin 37 to rock the swing gate and bring its upper extremity into contact with the inner extremity of the lever 27, thereby stabilizing the swing gate.

Operation of hand wheel 25 turns shaft 13 and swings lever 27 with the flexibly connected depending gate 33 thereon. As the sealing face of the swing gate communicates with the plate 6, any eccentricity between the plane of the swing gate and the plane of plate 6 is automatically adjusted by rotation of the swing gate about pin 37 against the action of springs 43. A gasket 49 seated in plate 6 between the plate and the swing gate is compressed by a force acting centrally of the swing gate, and the swing gate centers itself to lie uniformly in the plane normal to the axis of the opening in plate 6 and the axis of gasket 49. Uniform compression of the gasket 49 provides a high degree of sealing integrity about the periphery of the plate.

The seal is broken merely by reversing the hand wheel 25, the shaft 13 rocking to withdraw the swing gate from the outer surface of plate 6. It will be noted that, in addition to permitting automatic adjustment for the flexible mounting required in swing gate 33 with respect to lever 27, springs 43 maintain the swing gate at all times in a position between the lever 27 and the opening for vessel 3, regardless of the direction of rotation and the positioning of the vessel. This renders the swing gate ideally suitable for rotary mixing vessels, driers and blenders. The U-shaped configuration of plate 6 provides a dispensing guide for feeding material to and from the openings in plates 6 and ring 9 for the vessel in a particular processing operation. Furthermore, rim 7 provides a rim for attachment of a sleeve to prevent the escape of materials which may be valuable, obnoxious, or deleterious.

It is to be noted that, in addition to high sealing integrity, the gate surfaces are readily accessible for cleaning when the valve gate is in the fully opened position, that all control mechanism is external to the gate, thus preventing contamination of the material with lubricants, and that all mechanisms which might entrain material of poor flow characteristics are external to the closed vessel. When the gate is used as the closure at the apex of a frusto-conical vessel of which plate 6 is an integral part as shown in Fig. 5, the closed vessel has a smooth interior and all intersections of the gate and frusto-conical vessel are obtuse angles least apt to form pockets of stagnant material.

I claim:

An enclosed drying vessel wherein material is processed under controlled temperature and pressure comprising a shaft rotably mounted at the side of an opening into the vessel, a single lever arm fast on the shaft having arms extending laterally from the distal end thereof and substantially parallel to the shaft, a swing gate closure permitting charging of materials into and discharging of materials from the vessel pivotally mounted at an intermediate portion of said lever arm and at the gate's center to swing about the lever arm on an axis parallel to the axis of the shaft, said gate being so mounted on the lever arm as to center itself in place about the closure opening as the lever arm is moved in a direction toward the vessel, compression spring means interposed between the outer ends of said laterally extending arms and said gate and exerting a force against said gate whereby when said gate is in an open position said springs will exert forces against the gate at each side of said pivotal mounting tending to hold the gate against the lever arm at the end thereof adjacent the shaft, and whereby when said gate is in a closed position pressure will be applied against said gate at three points to maintain it in its closed position, and worm gearng for turning said shaft to swing said gate into and out of sealing relation with the portion of the vessel surrounding the opening, said worm gearing forming the sole means for maintaining said gate in its sealing position.

References Cited in the file of this patent

UNITED STATES PATENTS

| | | |
|---|---|---|
| 522,137 | Walker | June 26, 1894 |
| 991,905 | Sleeper | May 9, 1911 |
| 1,415,160 | Dow | May 9, 1922 |
| 1,645,171 | Weiss | Oct. 11, 1927 |
| 2,121,596 | Hill | June 21, 1938 |
| 2,210,294 | James | Aug. 6, 1940 |
| 2,264,180 | Koehler | Nov. 25, 1941 |
| 2,314,962 | Wood | Mar. 30, 1943 |